No. 28,514. PATENTED MAY 29, 1860.
H. J. SPILLER.
VENTILATING ROLLER BOX.
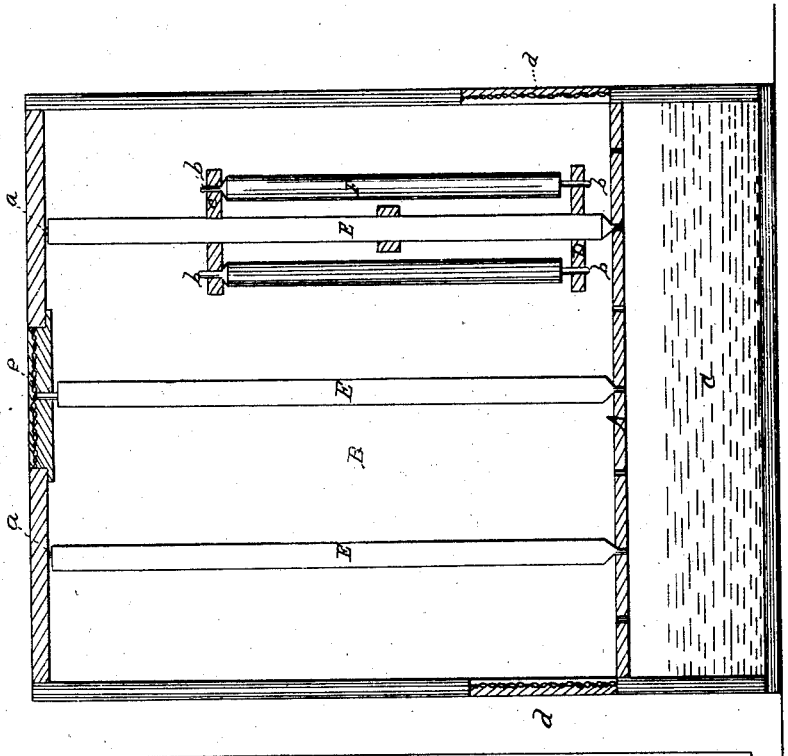
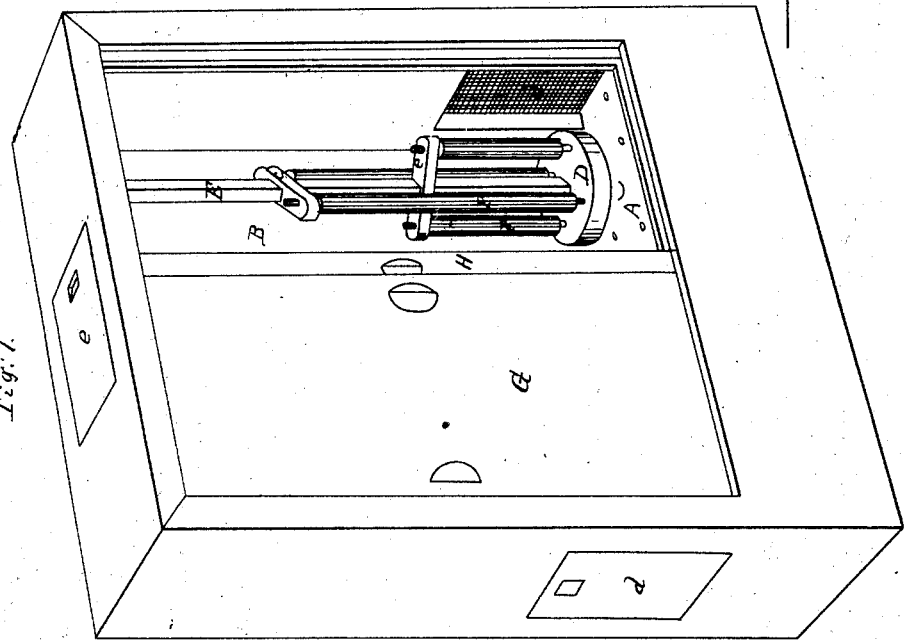
Witness
Wm Clough
Charles L. Fisher
Inventor
Henry J. Spiller

UNITED STATES PATENT OFFICE.

HENRY J. SPILLER, OF CINCINNATI, OHIO.

ROLLER-BOX FOR PRINTERS.

Specification of Letters Patent No. 28,514, dated May 29, 1860.

*To all whom it may concern:*

Be it known that I, HENRY J. SPILLER, of Cincinnati, in the county of Hamilton and State of Ohio, have invented a new and useful Improvement in Roller-Boxes for Printers' Rollers; and I do hereby declare that the following is a full and complete description thereof, reference being had to the accompanying drawings and letters of reference marked thereon, making a part of this specification.

My invention is for the purpose of affording a convenient box to contain the rollers, also to provide for exposing them to the vapor of water in dry weather and to ventilation when required. The peculiar nature of the substance from which printers' rollers are composed is such that either an excess of moisture or a very dry condition of the atmosphere is injurious in its effects upon them, and it becomes therefore important to be able to control the state of the atmosphere to which they are exposed when not in use.

In the accompanying drawings, Figure 1 is a perspective view of my improved roller box and Fig. 2 is a sectional elevation of the same.

It consists of a shallow rectangular frame of boards resting upon one of its narrow faces and of any convenient width. It is divided transversely by a perforated partition A into two chambers or divisions—an upper division or space for rollers B and a lower division or space for water C. The uper division B should have a height sufficient to receive the longest rolls which will require to be inclosed in the box, standing vertically, when supported with one end resting upon the reel head D as will be explained. The lower division of the box may be of any convenient depth sufficient to contain several gallons of water, and this part of the box may be made water tight in itself, or it may be made to contain a water tight metal vessel, so arranged with reference to the reels which contain the rolls in the upper division, as to receive and contain any water which may drain from them when placed there immediately after being washed.

The reels consist of a single stock of square wood E reduced to a point at its lower end and resting by this point in a step in the transverse partition A. Extending vertically to the top of the inside of the box or of the upper chamber, it passes through the upper casing of the box by a shank (*a*), which for strength and convenience may be made of iron and may be driven through an appropriate opening in the upper casing of the box and into the end of the reel stock E. The reel will thus be free to rotate upon the point of rest upon the partition A, being held in a vertical position by the shank (*a*) passing through the upper casing as has been described, and into the end of stock E, as has also been described.

The reel head D consisting of a circular block is fitted and secured to the lower end of reel stock E. It is furnished with four holes at equal distances from each other, placed near the periphery of the block and these holes are adapted to receive the shanks (*b*) of the stock of the rollers F. The rollers F resting by their lower ends upon the reel head D extend upwardly parallel with the reel stock E, and are retained thus by sliding reel heads (*c*). These are rectangular blocks having a square eye through their centers by which they slide freely up and down in the box, the reel stock E working in the center square eyes. Each reel is designed to carry four rolls and as the blocks or movable reel heads (*c*) may be moved up and down to suit the length of the rolls, by constructing each block or movable head with reference to but one roll, and furnishing each reel stock with four movable heads, the same reel may be made to accommodate four rollers of as many different lengths. The upper chamber B of roller box, or that which contains the rollers is opened and closed by sliding doors G, H, which opening either way laterally, by sliding in their appropriate grooves, one door by the other, either half of the roller box is at any time displayed open. The chamber is also furnished with ventilators (*d*) (*d*) (*e*), the two former in the narrow sides of the upper chamber near the bottom, or transverse partition A, and the other in the upper or top casing. They consist of square openings covered with wire gauze, the openings having likewise, close fitting wooden doors adapted to them.

When in use, the box having been made as described, of any convenient length sufficient to accommodate as many reels, each to hold four rollers as desired, and the lower chamber having a quantity of water to give off vapor for the purpose described, the operator is enabled by opening or closing the ventilators to permit any amount of circulation of air that may be desired, and also by regulating the supply of air, to control perfectly the amount of vapor which it is desired to have in the air surrounding the rollers, thus preserving the surface of the rollers from being rendered dry and horny by the absence of vapor upon the one hand or from being softened unduly, and partly dissolved by an excess of vapor upon the other hand.

The arrangement of the movable heads to the reels permits of bestowing a great number of rollers of varying lengths into a small compass and the revolving of the reels in the box as has been described enables the rollers to be inspected from time to time and also enables the operator to bring any one which may be desired for use to the front, and to a convenient position to be removed from the reel.

It may be remarked that my improved roller box has been in use for several months with the best results, and that although the purpose and design of the improvement may appear at first sight unimportant yet persons acquainted with the delays and annoyances to which printers are exposed from the apparently trifling influences which my improvement is designed to counteract, will fully appreciate its importance.

Having fully described my invention what I claim as new and desire to secure by Letters Patent, is—

The ventilating roller box as described, consisting essentially of roller chamber B water chamber C ventilators $d$, $d$, $e$, sliding doors G H and vertical reels consisting of stock E stationary head D and movable heads $c$ all constructed and arranged substantially as and for the purpose set forth.

HENRY J. SPILLER.

Witnesses:
WM. CLOUGH,
CHARLES L. FISHER.